Patented Aug. 6, 1946

2,405,183

UNITED STATES PATENT OFFICE 2,405,183

ENDOETHYLENE HALOCYCLO-PENTANOINDANES

Herman A. Bruson, Philadelphia, Pa., assignor to The Resinous Products & Chemical Company, Philadelphia, Pa., a corporation of Delaware No Drawing. Application April 1, 1944, Serial No. 529,194

8 Claims. (Cl. 260—649)

This invention deals with addition-rearrangement products of 1,4-endomethylene tetrahydrofluorene and hydrogen halides having a molecular weight of at least thirty-six.

According to this invention, hydrogen halides, such as hydrochloric acid, hydrobromic acid, or hydriodic acid, are reacted with 1,4-endomethylene tetrahydrofluorene whereby a simultaneous addition of the hydrogen halide and a molecular rearrangement involving ring opening occurs in accordance with the following equation:

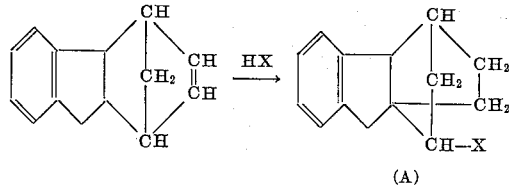

(A)

or

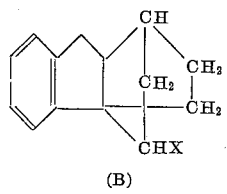

(B)

The product (A) or (B) is an endoethylene halocyclopentanoindane.

In carrying out the reaction, an aqueous solution of the hydrogen halide is rapidly stirred with 1,4-endomethylene tetrahydrofluorene, advantageously with heating, until the reaction is essentially complete. This requires from about two to five hours when the ordinary concentrated acids of commerce are used. The addition-rearrangement reaction takes place but slowly when the solutions of halogen acids are mixed with the 1,4-endomethylene tetrahydrofluorene at room temperature, but proceeds with increased rapidity as the temperature is raised. Temperatures up to 110°–120° C. may be used, the preferred range of temperature being from about 65° C. to about 95° C.

Advantageously, the strength of the aqueous acid should be 20% or more, but more dilute solutions may be used. The ordinary acids of commerce are entirely satisfactory, but even higher concentrations may be used.

The 1,4-endomethylene tetrahydrofluorene used for the purpose of this invention has been described by Alder and Rickert (Berichte der Deutsch. Chem. Ges. 71, 386 (1938)) and is prepared by heating cyclopentadiene with indene.

The products are valuable intermediates in the drug and insecticide fields. They possess reactivity not only as to the halogen introduced in the endoethylene cyclopentano group but also as to the opposite terminal cycle, a phenyl group. This may be hydrogenated, sulfonated, nitrated, halogenated, or alkylated by the usual reactions which are applied to benzene rings. The new compounds of this invention provide, therefore, valuable intermediates for the preparation of a great variety of other new compounds of wide utility.

The following examples illustrate this invention:

Example 1

A mixture of 55 grams of 1,4-endomethylene tetrahydrofluorene and 100 grams of concentrated hydrochloric acid containing about 35% HCl was rapidly stirred and heated for four and one-half hours at 80°–90° C. The product was washed with water and with dilute soda solution, dried, and distilled in vacuo.

The crude endoethylene chlorocyclopentanoindane distilled over at 130°–133° C./1–2 mm. as a pale yellow oil in a yield of 52–55 grams. Upon redistillation, the pure compound boiled at 118°–120° C./0.5 mm.

Example 2

A mixture of 55 grams of 1,4-endomethylene tetrahydrofluorene and 100 grams of aqueous hydrobromic acid (40%–42% HBr) was stirred at 88°–90° C. for three hours, then washed with water, dried, and distilled in vacuo.

The endoethylene bromocyclopentanoindane boiled at 138°–140° C./1 mm. in a yield of 40–45 grams.

Example 3

A mixture of 55 grams of 1,4-endomethylene tetrahydrofluorene and 250 grams of hydriodic acid (50% HI) was stirred at 65°–75° C. for three hours. The product was washed with water and with soda solution, dried, and distilled in vacuo.

The endoethylene iodocyclopentanoindane distilled over at 155°–160° C./1 mm. as a reddish oil which rapidly darkened on standing.

I claim:

1. A method for preparing an endoethylene halocyclopentanoindane which comprises reacting 1,4-endomethylene tetrahydrofluorene with an aqueous solution of hydrogen chloride of at least 20% strength at a temperature of about 65° C. to about 95° C.

2. A method for preparing an endoethylene halocyclopentanoindane which comprises reacting 1,4-endomethylene tetrahydrofluorene with an aqueous solution of hydrogen bromide of at least 20% strength at a temperature of about 65° C. to about 95° C.

3. A method for preparing an endoethylene halocyclopentanoindane which comprises reacting 1,4-endomethylene tetrahydrofluorene with an aqueous solution of hydrogen iodide of at least 20% strength at a temperature of about 65° C. to about 95° C.

4. A method for preparing an endoethylene halocyclopentanoindane which comprises reacting 1,4-endomethylene tetrahydrofluorene with an aqueous solution containing at least 20% of a hydrogen halide of a molecular weight of at least thirty-six at a temperature of about 65° C. to about 95° C.

5. As a new compound, an addition-rearrangement product of 1,4-endomethylene tetrahydrofluorene and a hydrogen halide of a molecular weight of at least thirty-six, said product being an endoethylene halocyclopentanoindane.

6. As a new compound, endoethylene chlorocyclopentanoindane, said compound being an addition-rearrangement product of hydrochloric acid and 1,4-endomethylene tetrahydrofluorene.

7. As a new compound, endoethylene bromocyclopentanoindane, said compound being an addition-rearrangement product of hydrobromic acid and 1,4-endomethylene tetrahydrofluorene.

8. As a new compound, endoethylene iodocyclopentanoindane, said compound being an addition-rearrangement product of hydriodic acid and 1,4-endomethylene tetrahydrofluorene.

HERMAN A. BRUSON.